(12) United States Patent
Hayamizu et al.

(10) Patent No.: US 12,011,917 B2
(45) Date of Patent: Jun. 18, 2024

(54) IMAGE FORMING APPARATUS THAT DETECTS STATUS OF TRANSPORT BELT THAT TRANSPORTS RECORDING MEDIUM

(71) Applicant: KYOCERA Document Solutions Inc., Osaka (JP)

(72) Inventors: Hitoshi Hayamizu, Osaka (JP); Daijiro Ueno, Osaka (JP); Tetsuya Ueno, Osaka (JP); Hisaji Kawai, Osaka (JP); Haruki Sayama, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 136 days.

(21) Appl. No.: 17/972,627

(22) Filed: Oct. 25, 2022

(65) Prior Publication Data

US 2023/0132842 A1 May 4, 2023

(30) Foreign Application Priority Data

Oct. 28, 2021 (JP) .................. 2021-176865

(51) Int. Cl.
*B41J 11/00* (2006.01)
*B41J 29/17* (2006.01)
*B41J 29/377* (2006.01)
*G01N 21/89* (2006.01)
*G01N 29/04* (2006.01)
*G01N 29/24* (2006.01)

(52) U.S. Cl.
CPC .......... *B41J 11/0095* (2013.01); *B41J 11/007* (2013.01); *B41J 29/17* (2013.01); *B41J 29/377* (2013.01); *G01N 21/89* (2013.01); *G01N 29/04* (2013.01); *G01N 29/2437* (2013.01); *G01N 2291/023* (2013.01); *G01N 2291/048* (2013.01); *G01N 2291/102* (2013.01)

(58) Field of Classification Search
CPC ...... B41J 11/0095; B41J 11/007; B41J 29/17; B41J 29/377; B41J 29/38; G01N 21/89; G01N 29/04; G01N 29/2437; G01N 2291/023; G01N 2291/048; G01N 2291/102; G01N 21/94; G01N 2291/025; G01N 29/043; G01N 29/245; G01N 29/44
USPC ......................................................... 347/19
See application file for complete search history.

(56) References Cited

FOREIGN PATENT DOCUMENTS

JP 2006103155 A 4/2006
JP 2006187990 A 7/2006

*Primary Examiner* — Jason S Uhlenhake
*Assistant Examiner* — Alexander D Shenderov
(74) *Attorney, Agent, or Firm* — IP Business Solutions, LLC

(57) ABSTRACT

An image forming apparatus includes an image forming device, a transport belt, an optical sensor, an ultrasonic sensor, and a controller. The transport belt transports the recording sheet. The optical sensor emits light to the transport belt, and receives the light reflected by the transport belt. The ultrasonic sensor transmits ultrasonic wave to the transport belt, and receives the ultrasonic wave transmitted through the transport belt. The controller decides whether an output from each of the optical sensor and the ultrasonic sensor represents a normal value or an abnormal value, and executes predetermined control, depending on a combination of decision results about the respective outputs from the optical sensor and the ultrasonic sensor.

9 Claims, 12 Drawing Sheets

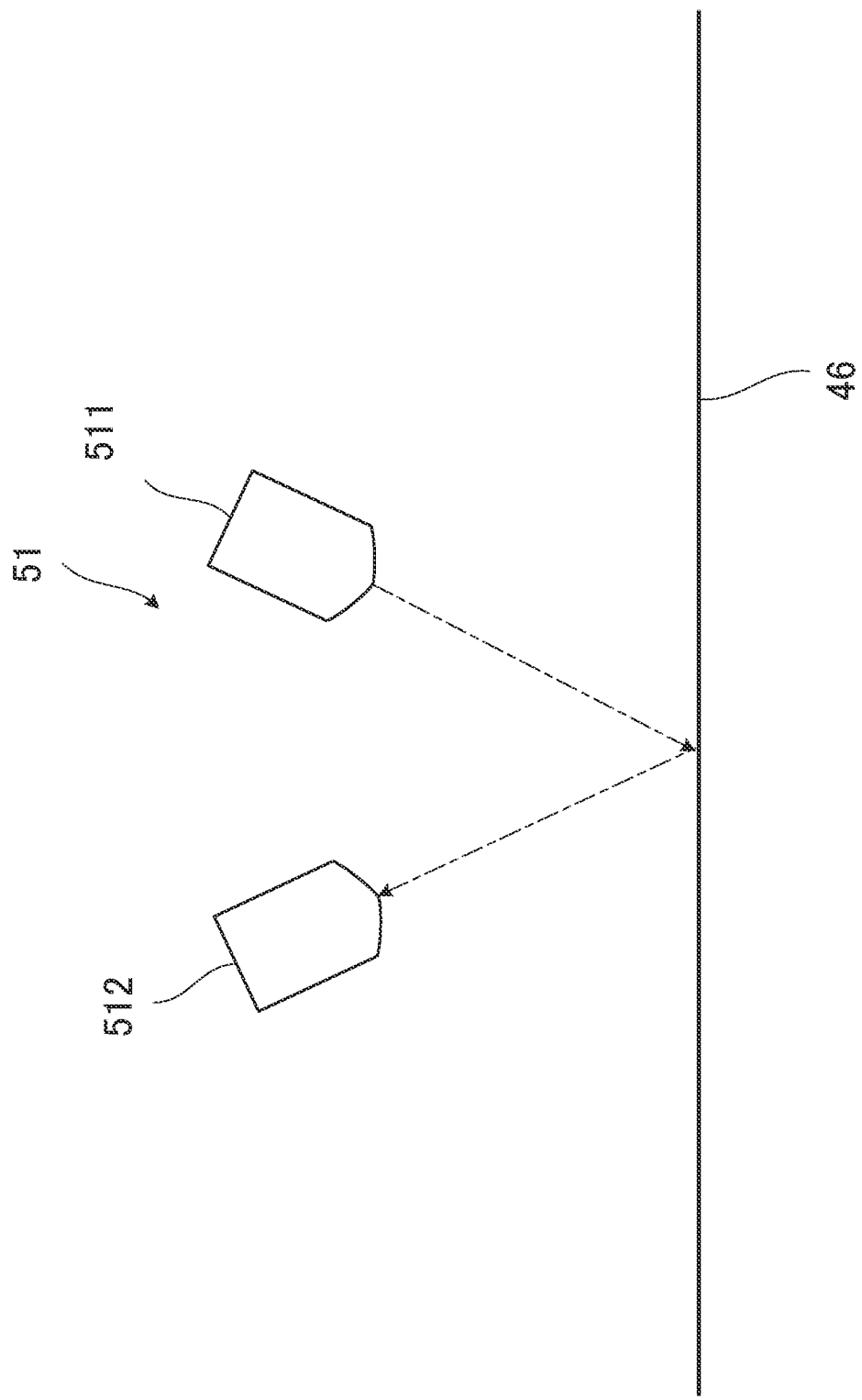

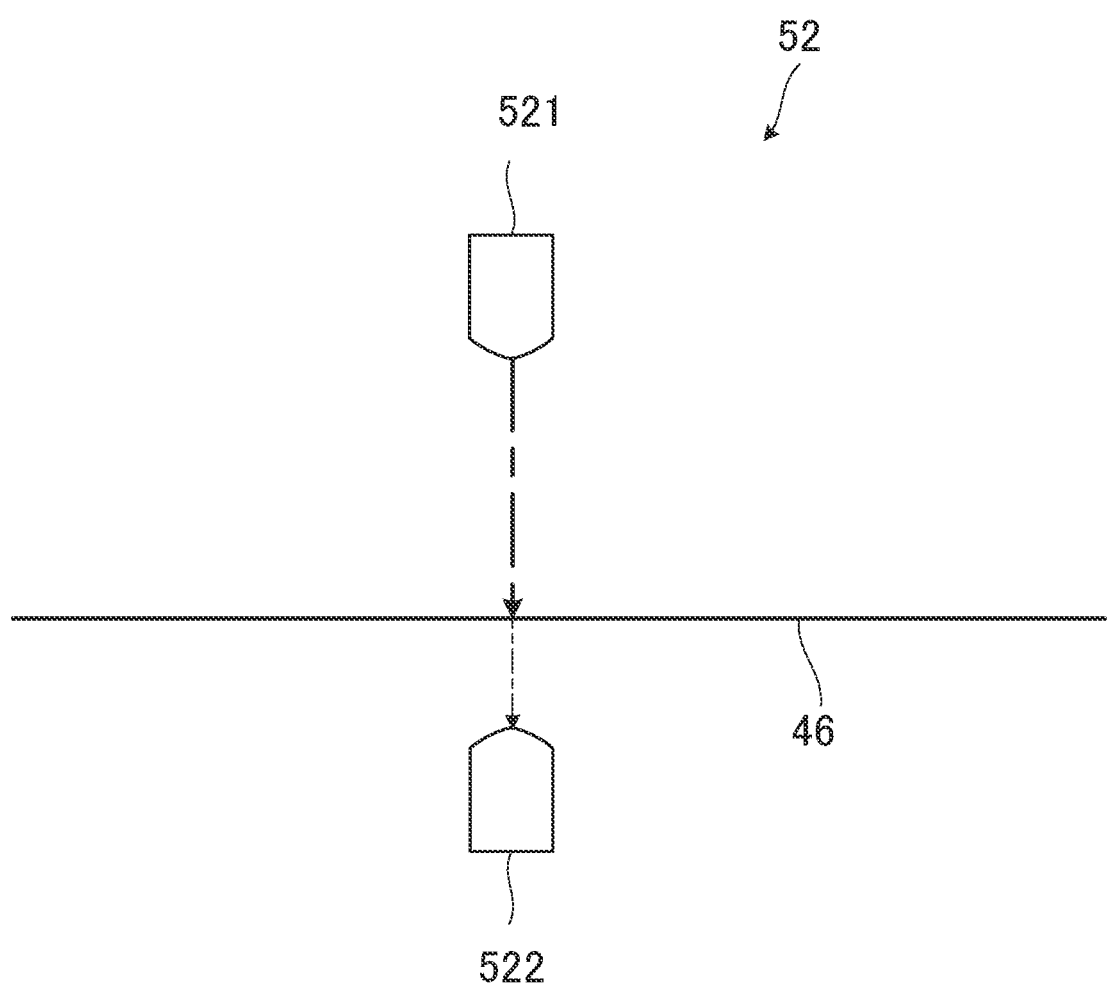

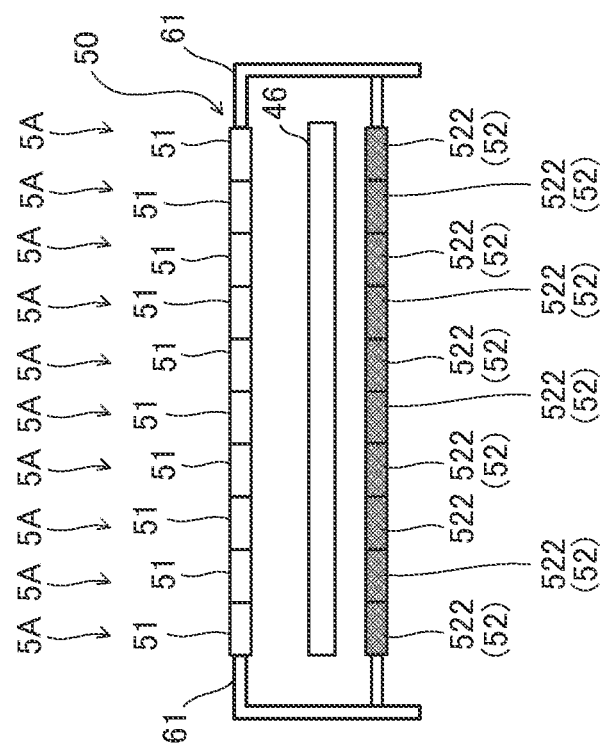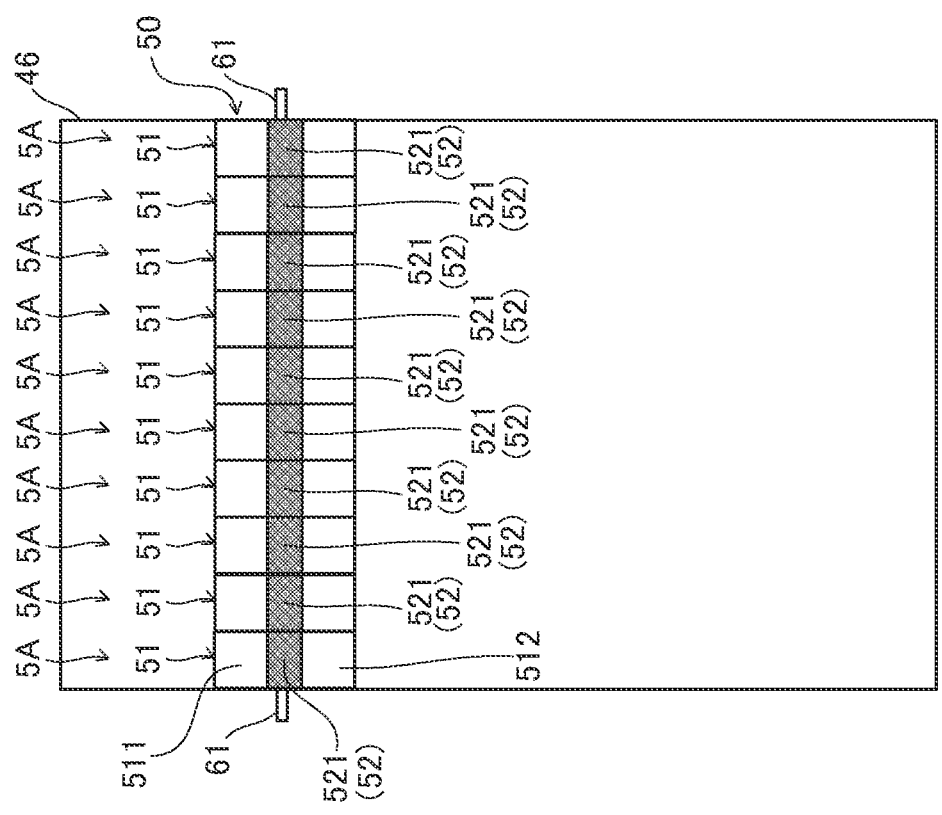

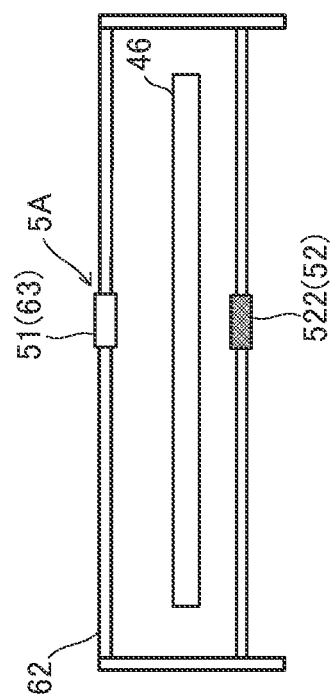
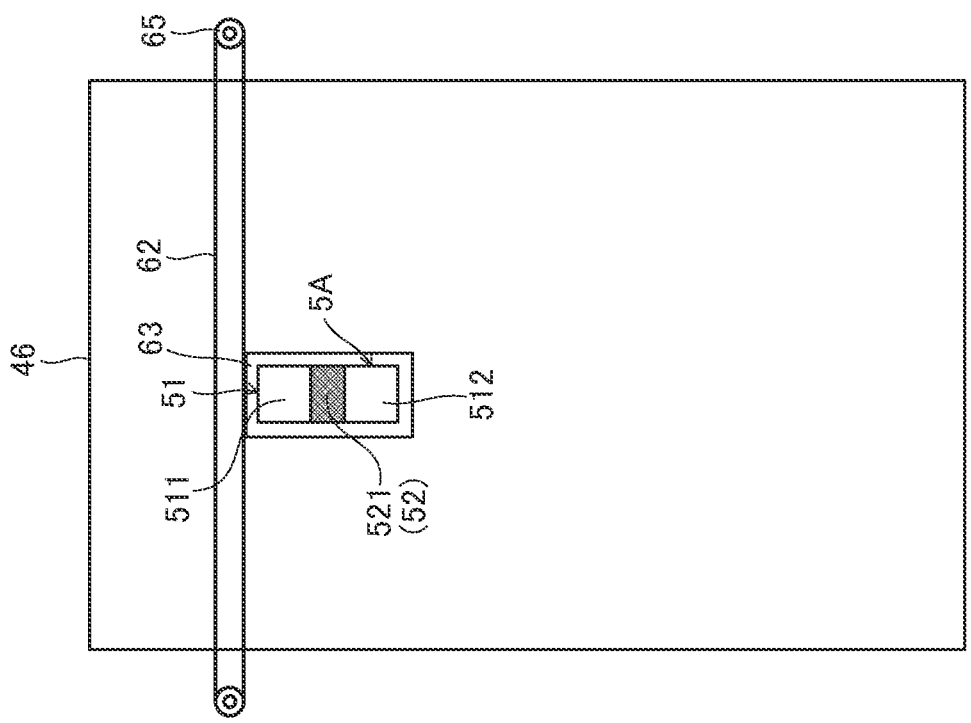

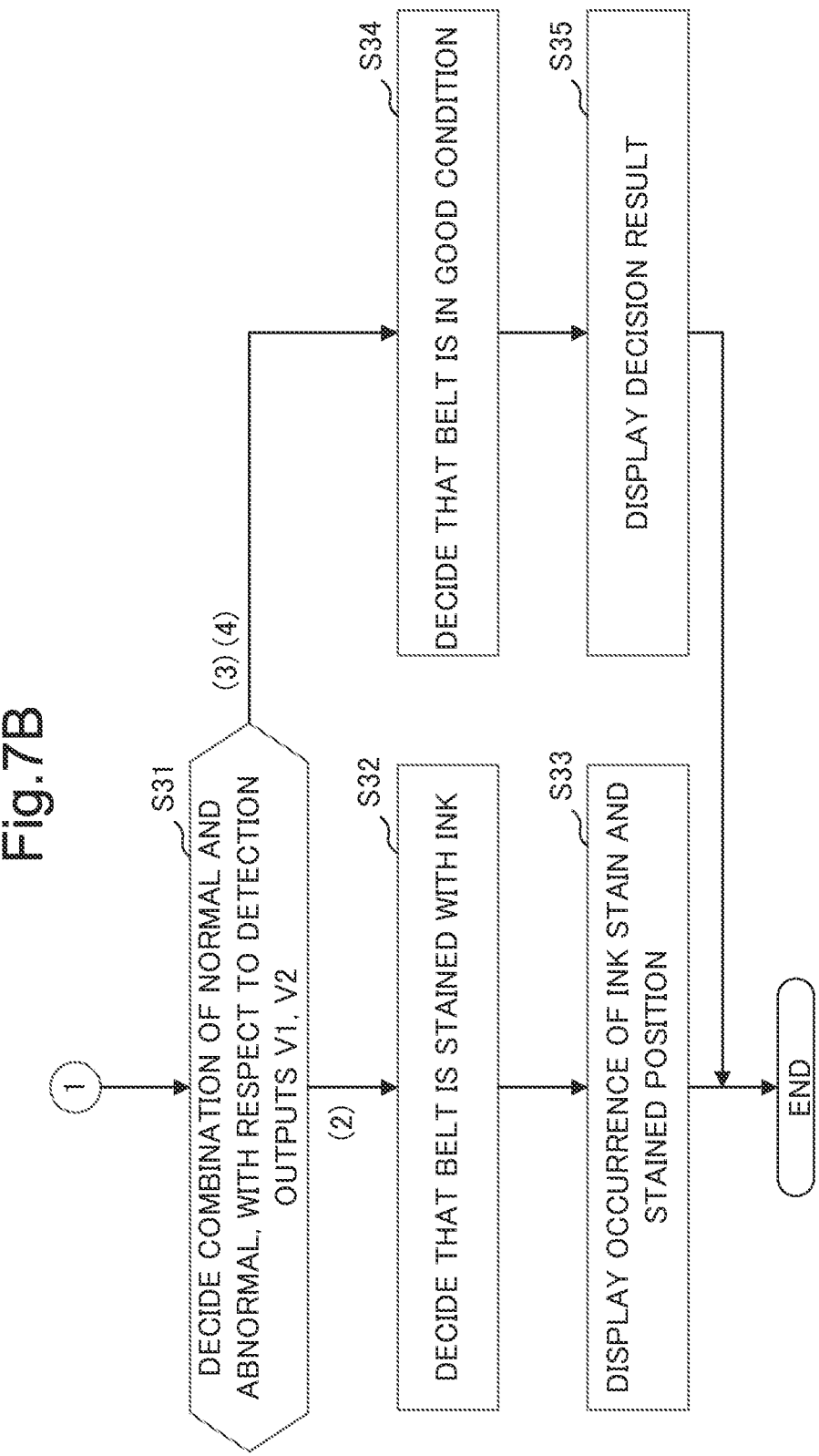

Fig.8

| | OPTICAL SENSOR | ULTRASONIC SENSOR |
|---|---|---|
| (1) | ABNORMAL VALUE | ABNORMAL VALUE |
| (2) | ABNORMAL VALUE | NORMAL VALUE |
| (3) | NORMAL VALUE | ABNORMAL VALUE |
| (4) | NORMAL VALUE | NORMAL VALUE |

IMAGE FORMING APPARATUS THAT DETECTS STATUS OF TRANSPORT BELT THAT TRANSPORTS RECORDING MEDIUM

INCORPORATION BY REFERENCE

This application claims priority to Japanese Patent Application No. 2021-176865 filed on Oct. 28, 2021, the entire contents of which are incorporated by reference herein.

BACKGROUND

The present disclosure relates to an image forming apparatus, and in particular to a technique to detect a status of a transport belt that transports a recording medium to an image forming device.

Some of existing ink jet image forming apparatuses are configured to detect a status of a transport belt that transport a recording medium, or a platen that supports the recording medium, with an optical sensor. In such an image forming apparatus, the stain of the transport belt or the platen is detected, on the basis of a difference between an output value from the optical sensor and a reference value.

SUMMARY

The disclosure proposes further improvement of the foregoing techniques.

In an aspect, the disclosure provides an image forming apparatus including an image forming device, an endless transport belt, an optical sensor, an ultrasonic sensor, and a controller. The image forming device forms an image on a recording medium. The transport belt transports the recording medium placed on a surface thereof, to an image forming position where the image forming device forms the image on the recording medium. The optical sensor includes a light emitting element that emits light to the transport belt, and a photodetector that receives the light reflected by the transport belt. The ultrasonic sensor includes a transmitter that transmits ultrasonic wave to the transport belt, and a receiver that receives the ultrasonic wave transmitted through the transport belt. The controller decides whether an output from each of the photodetector of the optical sensor and the receiver of the ultrasonic sensor represents a normal value or an abnormal value, and executes predetermined control, depending on a combination of decision results about the respective outputs from the photodetector and the receiver.

BRIEF DESCRIPTION OF THE DRAWINGS

FIG. 2 is a schematic drawing showing an exemplary configuration of an optical sensor;

FIG. 3 is a schematic drawing showing an exemplary configuration of an ultrasonic sensor;

FIG. 4A is a plan view showing exemplary locations of the optical sensor and the ultrasonic sensor;

FIG. 4B is a side view showing exemplary locations of the optical sensor and the ultrasonic sensor;

FIG. 5A is a plan view showing another example of the locations of the optical sensor and the ultrasonic sensor;

FIG. 5B is a side view showing another example of the locations of the optical sensor and the ultrasonic sensor;

FIG. 7B is a flowchart showing another process of detecting abnormality of the transport belt, performed by the ink jet recording apparatus;

FIG. 8 is a table showing combinations of normal and abnormal values based on detection outputs from the optical sensor and the ultrasonic sensor;

DETAILED DESCRIPTION

Figure 1:
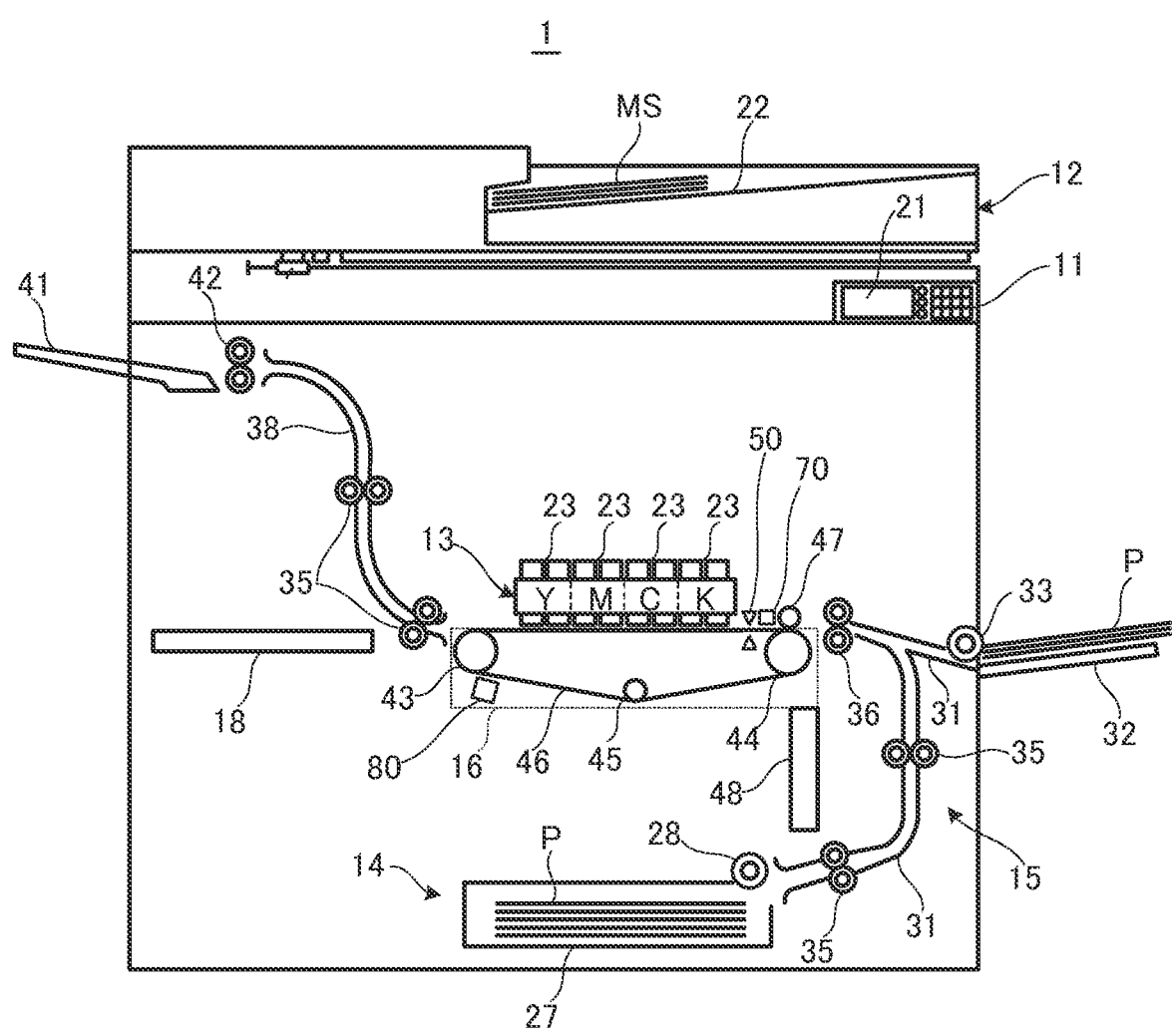
FIG. 1 is a cross-sectional view showing an ink jet recording apparatus exemplifying an image forming apparatus according to an embodiment of the disclosure.

Hereafter, an image forming apparatus according to an embodiment of the disclosure will be described, with reference to the drawings. FIG. 1 is a cross-sectional view showing an ink jet recording apparatus, exemplifying the image forming apparatus according to the embodiment of the disclosure. The ink jet recording apparatus 1 according to this embodiment includes an operation device 11, a document reading device 12, an image forming device 13, a paper feeding device 14, a transport device 15, a belt unit 16, a cap 18, an adsorption roller 47, an elevation mechanism 48, and a sensor unit 50.

The operation device 11 is operated by a user, to input instructions related to the functions and processings that the ink jet recording apparatus 1 is configured to perform. For example, the operation device 11 includes physical keys such as a tenkey, an enter key, and a start key. The operation device 11 also includes a display device 21.

The display device (exemplifying the alerter in the disclosure) 21 includes, for example, a liquid crystal display (LCD). The display device 21 includes a touch panel. When the user touches a button or a key displayed on the screen, the touch panel receives the instruction corresponding to the touched position.

When a source document MS is placed on a document tray 22, the document reading device 12 picks up the source document MS from the document tray 22, and reads the image of the source document MS with an image sensor, while transporting the source document MS. The analog output from the image sensor is converted to a digital signal, and image data representing the image of the source document MS is generated.

The image forming device 13 serves to print the image of the source document MS represented by the image data, on a recording sheet (exemplifying the recording medium in the disclosure) P, by ejecting ink droplets of four colors (black, cyan, magenta, and yellow) onto the recording sheet P transported by a transport belt 46 of the belt unit 16, thereby forming a color image on the recording sheet P. To be more detailed, the image forming device 13 includes line heads (exemplifying the ink head in the disclosure) 23 respectively corresponding to the black, cyan, magenta, and yellow inks. In other words, the ink jet recording apparatus 1 is configured as a line head-type ink jet recording apparatus.

The recording sheet P delivered from the paper feeding device 14 is transported to the transport belt 46 of the belt unit 16 through the transport route 31 of the transport device 15, and then delivered from the transport belt 46 to an output tray 41, through a transport route 38 of the transport device 15.

The paper feeding device 14 includes a paper cassette 27. A pickup roller 28 is provided on the paper cassette 27, to pick up the recording sheet P stored in the paper cassette 27, and deliver the recording sheet P to the transport route 31.

The paper feeding device 14 also includes a manual bypass tray 32 provided on a side wall of the apparatus main body. The recording sheet P placed on the manual bypass tray 32 is picked up by a pickup roller 33, and delivered to the transport route 31.

The transport device 15 includes the transport route 31 for transporting the recording sheet P delivered from the paper feeding device 14, transport rollers 35 located at predetermined positions on the transport routes 31 and 38, a resist roller 36 that corrects a skew of the recording sheet P when delivering the recording sheet P to the transport belt 46 of the belt unit 16, a transport route 38 for transporting the recording sheet P transported by the transport belt 46, and a delivery roller 42 that delivers the recording sheet P transported through the transport route 38 to the output tray 41.

The belt unit 16 includes a drive roller 43, a follower roller 44, a tension roller 45, and the transport belt 46. The transport belt 46 is an endless belt engaged around the drive roller 43, the follower roller 44, and the tension roller 45. The drive roller 43 is driven by a non-illustrated motor so as to rotate counterclockwise. When the drive roller 43 is made to rotate, the transport belt 46 is made to revolve counterclockwise, and also the follower roller 44 and the tension roller 45 are made to follow up the counterclockwise rotation.

The transport belt 46 transports the recording sheet P delivered by the transport device 15 through the transport route 31, by carrying the recording sheet P on the transport belt 46.

The tension roller 45 serves to maintain the tension of the transport belt 46 at an appropriate level.

The adsorption roller 47 is located in contact with the transport belt 46, and electrically charges the transport belt 46, to thereby cause the recording sheet P delivered from the paper feeding device 14 to electrostatically adsorb to the transport belt 46. Here, instead of the electrostatic adsorption, a plurality of ventilation holes may be formed in the transport belt 46, and a fan may be provided on the back of the transport belt 46. In this case, air is sucked by the fan through the ventilation holes of the transport belt 46, so that the sheet P is adsorbed to the transport belt 46 owing to a negative pressure.

The sensor unit 50 for detecting the status of the transport belt 46, and a fan 70 are provided so as to oppose the transport belt 46, on the upper side thereof. The fan 70 is located adjacent to the sensor unit 50. Here, although an optical sensor for detecting the presence of the recording sheet P on the transport belt 46 is also provided opposite thereto, the description and illustration of such optical sensor will be skipped in this embodiment.

Further, a cleaning device 80 is provided so as to oppose the surface of the transport belt 46, on which the recording sheet P is transported, at a different position. The cleaning device 80 may be, for example, a brush roll configured to move toward and away from the transport belt 46, to brush the surface of the transport belt 46 in contact therewith, or of a roll-nip type configured to move toward and away from the transport belt 46, to clean the surface of the transport belt 46 with water, in contact therewith.

The elevation mechanism 48 serves to sustain the belt unit 16 from below, and to move the belt unit 16 up and downward with respect to the line heads 23 of the image forming device 13. In other words, the elevation mechanism 48 moves the belt unit 16 relative to the line heads 23, so as to move the belt unit 16 toward and away from the line heads 23. To be more detailed, the elevation mechanism 48 moves the belt unit 16 between a recording position where the image forming device 13 can execute the printing operation (position shown in FIG. 1), and a maintenance position spaced downward in FIG. 1 from the recording position by a predetermined distance.

When the elevation mechanism 48 moves down the belt unit 16 to the maintenance position, a vacant space is defined under the image forming device 13. Then a moving mechanism 56 (see FIG. 6) horizontally moves the cap 18 to the position right under the image forming device 13, and then moves the cap 18 upward. Accordingly, the cap 18 is overlaid on the nozzles of the line heads 23 of the image forming device 13 so as to cover the same, so that the ink in the nozzles of the line heads 23 of the image forming device 13 can be prevented from drying.

The sensor unit 50 includes an optical sensor 51 and an ultrasonic sensor 52. FIG. 2 schematically illustrates an exemplary configuration of the optical sensor 51. Referring to FIG. 2, the optical sensor 51 includes a light emitting element 511 and a photodetector 512. The light emitting element 511 emits light to the transport belt 46. The light emitting element 511 is, for example, an LED. The photodetector 512 receives the light reflected by the transport belt 46 (surface thereof on which the recording sheet P is transported). The photodetector 512 is, for example, a photodiode.

The light emitting element 511 obliquely emits the light toward the transport belt 46. The photodetector 512 is located at the position and in the orientation, appropriate for receiving the light obliquely reflected by the transport belt 46. Upon receipt of the reflected light, the photodetector 512 outputs a detection output V1, indicating the reception level, to a controller 100 (see FIG. 6).

FIG. 3 schematically illustrates an exemplary configuration of the ultrasonic sensor 52. Referring to FIG. 3, the ultrasonic sensor 52 includes a transmitter 521 and a receiver 522. The ultrasonic sensor 52 is, for example, of a transmission type that detects the attenuation or interruption of the ultrasonic beam, arising from an object passing between the transmitter 521 and the receiver 522. The transmitter 521 emits the ultrasonic wave toward the transport belt 46. The transmitter 521 has, for example, a unimorph structure including a piezoelectric ceramic bonded to a metal plate, and emits the ultrasonic wave based on curvature movement created by the distortion of the unimorph vibrator as a whole, originating from the expansion and contraction of the piezoelectric ceramic. The receiver 522 receives the ultrasonic wave emitted from the transmitter 521 and attenuated upon being transmitted through the transport belt 46. The receiver 522 has, for example, a unimorph structure including a piezoelectric ceramic bonded to a metal plate, in which an inverse piezoelectric effect creates the curvature movement of the vibrator, when the ultrasonic vibration is applied to the vibrator, and outputs an electrical signal based on the curvature movement to the controller 100, as a detection output V2.

Hereunder, the location of the optical sensor 51 and the ultrasonic sensor 52, constituting the sensor unit 50, will be described. FIG. 4A is a plan view showing exemplary locations of the optical sensor and the ultrasonic sensor. FIG.

4B is a side view showing the exemplary locations of the optical sensor and the ultrasonic sensor.

As shown in FIG. 4B, a support member 61 is provided so as to oppose the surface of the transport belt 46 on which the recording sheet P is transported, with a spacing therebetween, the support member 61 extending in the width direction of the transport belt 46 orthogonal to the running direction thereof, and having both end portions attached to the main body of the ink jet recording apparatus 1. The support member 61 extends over the entire width of the transport belt 46. As shown in FIG. 4A and FIG. 4B, a plurality of units 5A, each including one set each of the optical sensor 51 and ultrasonic sensor 52, are aligned in the width direction, on the support member 61. The units 5A each including one set each of the optical sensor 51 and ultrasonic sensor 52 are located from one end portion to the other end portion of the transport belt 46, in the width direction. Here, whereas one set of the optical sensor 51 and one set of the ultrasonic sensor 52 constitute the unit 5A, the light emitting element 511 of the optical sensor 51 and the transmitter 521 of the ultrasonic sensor 52 in the same unit 5A are configured to emit the light and the ultrasonic wave, to the same position on the transport belt 46.

Hereunder, another example of the locations of the optical sensor 51 and the ultrasonic sensor 52, constituting the sensor unit 50, will be described. FIG. 5A is a plan view showing another example of the locations of the optical sensor and the ultrasonic sensor. FIG. 5B is a side view showing another example of the locations of the optical sensor and the ultrasonic sensor.

As shown in FIG. 5A and FIG. 5B, an endless belt 62 is provided so as to oppose the surface of the transport belt 46 on which the recording sheet P is transported, with a spacing therebetween, the endless belt 62 extending in the width direction of the transport belt 46, and being engaged on a pair of pulleys 65 located on the respective sides of the transport belt 46. The pulley 65 is rotatably attached to the apparatus main body, at a position outside of the entire width of the transport belt 46. The pulley 65 is made to rotate by rotative driving force transmitted from a non-illustrated drive motor, and causes the belt 62 to endlessly rotate in the width direction, with the rotating motion. A carriage 63, which moves together with the belt 62, is mounted on the belt 62. One set of the optical sensor 51, and the transmitter 521 of the ultrasonic sensor 52 are fixed to the carriage 63. The controller 100 controls the rotation of the drive motor, so as to move the carriage 63 (i.e., optical sensor 51 and ultrasonic sensor 52) above the transport belt 46, from one end portion to the other end portions in the width direction of the transport belt 46. The carriage 63, supporting the optical sensor 51 and the transmitter 521 of the ultrasonic sensor 52, includes an opening that enables the optical sensor 51 to emit and receive the light, and the ultrasonic sensor 52 to emit and receive the ultrasonic wave.

The receiver 522 of the ultrasonic sensor 52 is moved by a belt, pulleys, a carriage, and a drive motor similar to those described above, through a region under the transport belt 46, in the width direction thereof from one end portion to the other end portion of the transport belt 46 in the width direction. The controller 100 controls the rotation of the drive motor, so as to move the receiver 522 of the ultrasonic sensor 52 in synchronization with the movement of the transmitter 521 of the ultrasonic sensor 52, through the same track as the transmitter 521 of the ultrasonic sensor 52, across the transport belt 46.

In the case of the configuration shown in FIG. 4A, FIG. 4B, FIG. 5A and FIG. 5B also, the light emitting element 511 of the optical sensor 51 and the transmitter 521 of the ultrasonic sensor 52 are configured to emit the light and the ultrasonic wave, to the same position on the transport belt 46.

The fan 70 serves to send air to, or suck air from, the position on the transport belt 46 to which the light and the ultrasonic wave are emitted from the sensor unit 50 shown in FIG. 4A, FIG. 4B, FIG. 5A and FIG. 5B, thereby generating an airflow on the transport belt 46.

Figure 6:
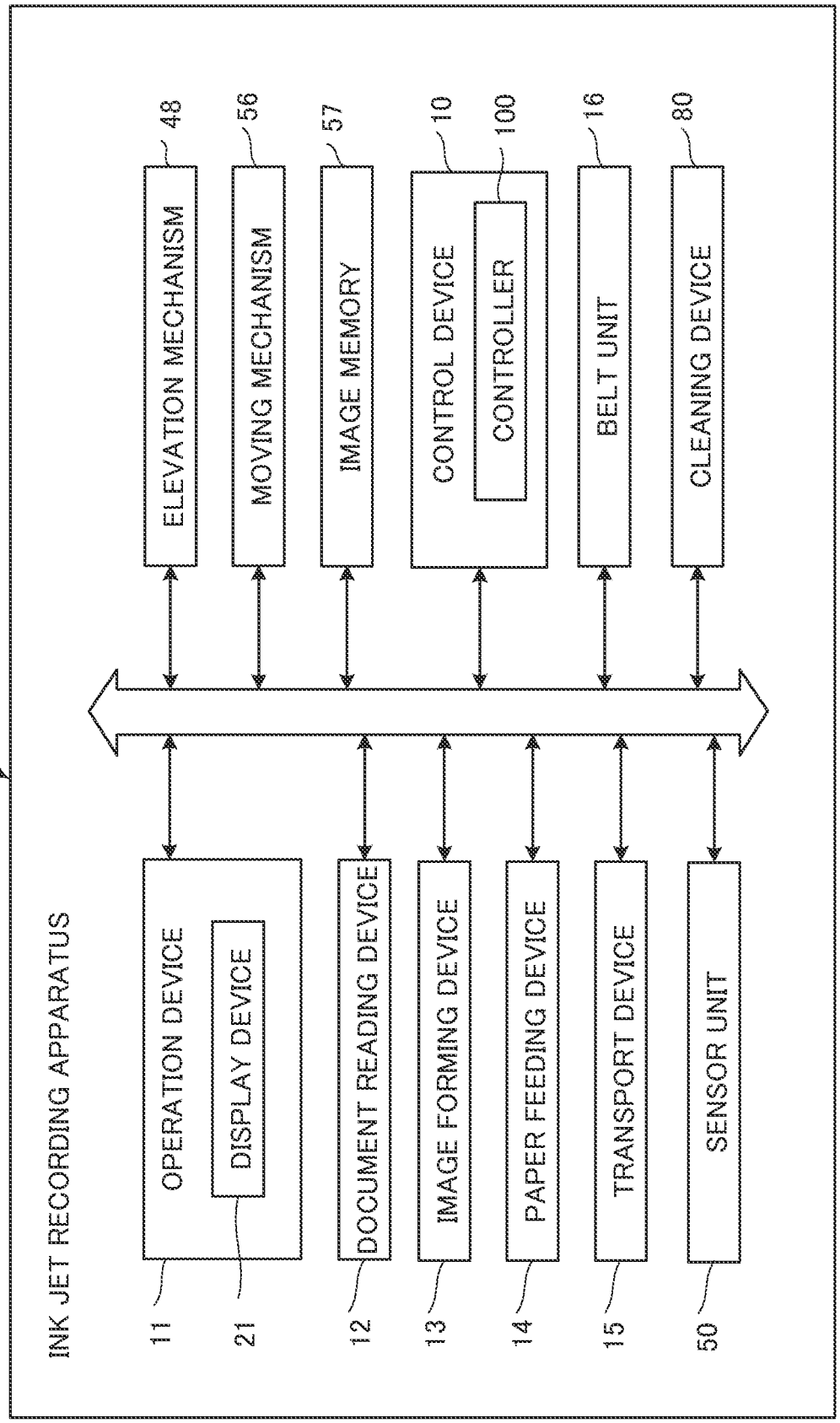
FIG. 6 is a functional block diagram showing an essential internal configuration of the ink jet recording apparatus according to the embodiment.

FIG. 6 is a functional block diagram showing an essential internal configuration of the ink jet recording apparatus 1 according to this embodiment. The ink jet recording apparatus 1 includes the operation device 11, the document reading device 12, the image forming device 13, the paper feeding device 14, the transport device 15, the belt unit 16, the elevation mechanism 48, the moving mechanism 56 for moving the cap 18 horizontally and vertically as above, an image memory 57, the sensor unit 50, the cleaning device 80, and a control device 10. The same reference numerals are given to the same components as those of the inkjet recording apparatus 1 shown in FIG. 1.

The control device 10 includes a processor, a random-access memory (RAM), a read-only memory (ROM), and an exclusive hardware circuit. The processor is, for example, a central processing unit (CPU), an application specific integrated circuit (ASIC), or a micro processing unit (MPU).

The control device 10 acts as the controller 100, when the processor executes various programs stored in a non-volatile memory. Here, the controller 100 may be constituted in the form of a hardware circuit, without limitation to being realized by the execution of the program.

The controller 100 serves to control the operation device 11, the document reading device 12, the image forming device 13, the paper feeding device 14, the transport device 15, the belt unit 16, the elevation mechanism 48, the moving mechanism 56, the sensor unit 50, the cleaning device 80, and the image memory 57, thus controlling the overall operation of the ink jet recording apparatus 1.

For example, the controller 100 controls the motor for driving the transport roller and the image sensor in the document reading device 12, thereby causing the document reading device 12 to transport the source document MS and read the image thereof, and then to store the image data representing the image of the source document MS, in the image memory 57.

The controller 100 also controls the motors for rotating the pickup roller, the transport roller, and the resist roller of the paper feeding device 14 and the transport device 15, or the motor for rotating the drive roller 43 of the transport belt 46, thereby causing the paper feeding device 14 to deliver the recording sheet P, and causing the transport belt 46 to transport the sheet P.

The controller 100 controls the line heads 23 of the image forming device 13 thereby causing the line heads 23 to eject the ink, on the basis of the image data stored in the image memory 57 and representing the image of the source document MS, thus causing the image forming device 13 to form the image of the source document MS on the recording sheet P being transported by the transport belt 46.

Further, the controller 100 controls the motor or actuator of the elevation mechanism 48 and the moving mechanism 56, to thereby move the belt unit 16 up or downward, and move the cap 18 horizontally or vertically.

Figure 7A:
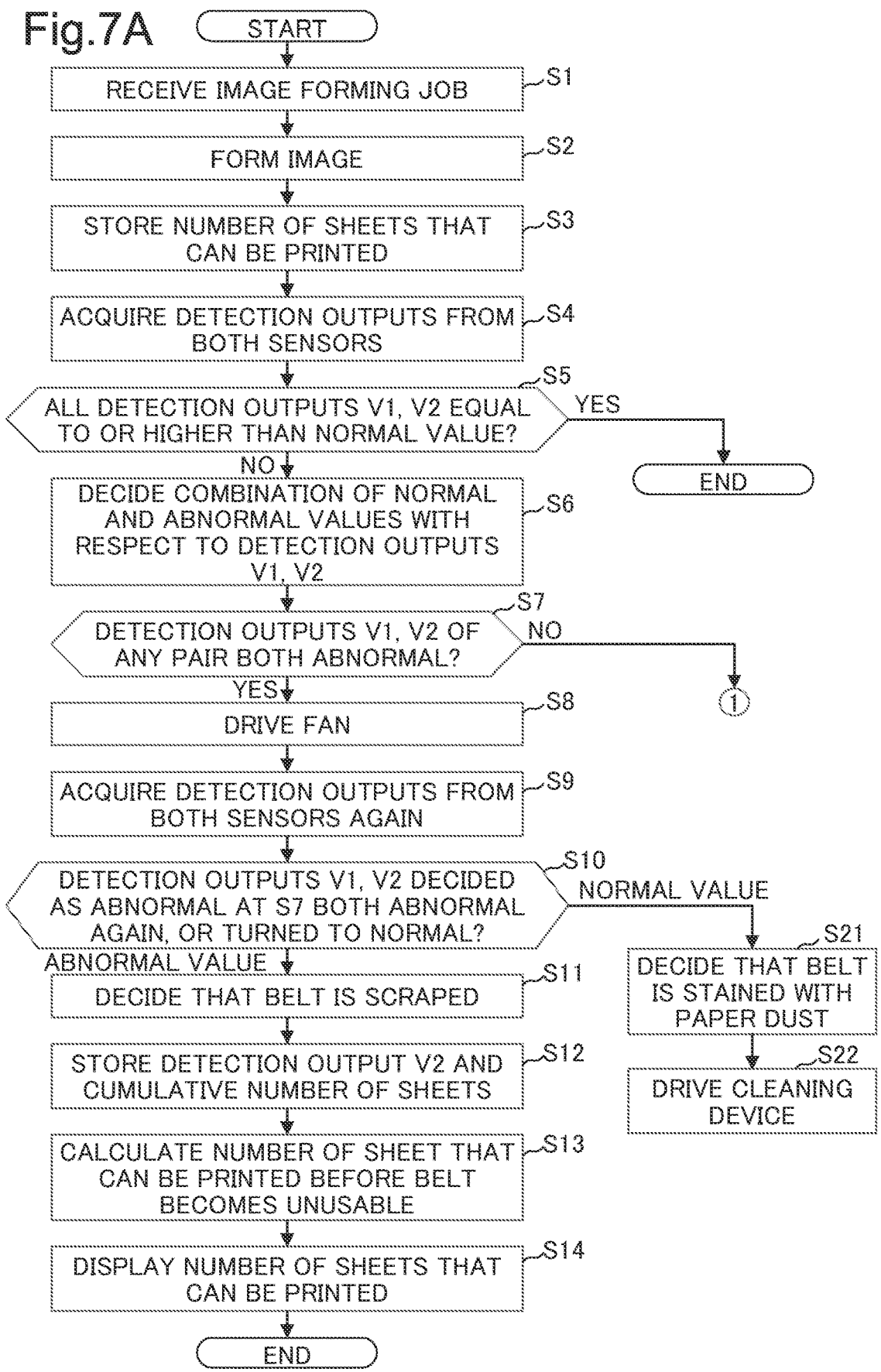
FIG. 7A is a flowchart showing a process of detecting abnormality of a transport belt, performed by the ink jet recording apparatus.

Hereunder, a process performed by the ink jet recording apparatus 1, to detect abnormality of the transport belt 46 will be described. FIG. 7A and FIG. 7B are flowcharts each showing the process of detecting abnormality of the transport belt 46, performed by the ink jet recording apparatus 1.

Upon receipt of an image forming job (S1), the controller 100 causes the transport device 15 and the transport belt 46 to transport the recording sheet P to the position corresponding to the image forming device 13, and causes the image forming device 13 to form an image on the recording sheet P (S2). When all the images involved in the job have been formed, the controller 100 stores the number of recording sheets P on which the images have been formed according to the job, for example in a non-volatile memory incorporated in the control device 10 (S3). The cumulative number of recording sheets P, on which the images have been formed by the image forming device 13 since the use of the transport belt 46 started, is also stored in the non-volatile memory, and the controller 100 updates the cumulative number of sheets, each time the operation of S3 is executed. The time that the use of the transport belt 46 started may be, for example, inputted by the user through the operation device 11. The controller 100 starts to count the cumulative number of sheets from the time that the use of the transport belt 46 started, on the basis of the time inputted by the user.

Then the controller 100 acquires the detection output V1 from the photodetector 512 of the optical sensor 51, and the detection output V2 from the receiver 522 of the ultrasonic sensor 52 (S4). In the case where the sensor unit 50 is configured as the example shown in FIG. 4A and FIG. 4B, the controller 100 acquires the detection output V1 from the photodetectors 512 of all the optical sensors 51, and the detection output V2 from the receivers 522 of all the ultrasonic sensors 52. The controller 100 stores the respective outputs acquired from the photodetectors 512 of all the optical sensors 51 and the receivers 522 of all the ultrasonic sensors 52, aligned in the width direction of the transport belt 46, in association with the respective positions of the optical sensors 51 and the ultrasonic sensors 52 in the width direction.

In the case where the sensor unit 50 is configured as the example shown in FIG. 5A and FIG. 5B, the controller 100 causes the carriage 63 to move in the width direction of the transport belt 46, and acquires the detection output V1 from the photodetector 512 of the optical sensor 51, and the detection output V2 from the receiver 522 of the ultrasonic sensor 52, detected at a plurality of predetermined positions between one end portion and the other end portion of the transport belt 46 in the width direction. The controller 100 stores the respective outputs acquired from the photodetector 512 of the optical sensor 51 and the receiver 522 of the ultrasonic sensor 52, with respect to each of the plurality of positions in the width direction of the transport belt 46, in which the carriage 63 has moved, in association with the respective positions of the optical sensor 51 and the ultrasonic sensor 52 in the width direction.

Then the controller 100 compares all the detection outputs V1 acquired as above with a predetermined normal value V11, and decides whether all the detection outputs V1 are equal to or higher than the predetermined normal value V11. The controller 100 also compares all the detection outputs V2 acquired as above with a predetermined normal value V21, and decides whether all the detection outputs V2 are equal to or higher than the predetermined normal value V21 (S5). In the case where the controller 100 decides that all the detection outputs V1 are equal to or higher than the normal value V11, and that all the detection outputs V2 are equal to or higher than the normal value V21 (YES at S5), the operation is finished.

Here, the normal value is represented by a predetermined value of the detection output from the photodetector 512 of the optical sensor 51 or the receiver 522 of the ultrasonic sensor 52, acquired in the state where the surface of the transport belt 46 for transporting thereon the recording sheet P is free from an ink stain, belt scraping, and paper dust stain. In contrast, an abnormal value is represented by a predetermined value of the detection output from the photodetector 512 of the optical sensor 51 or the receiver 522 of the ultrasonic sensor 52, acquired in the state where the surface of the transport belt 46 for transporting thereon the recording sheet P may suffer any of the ink stain, belt scraping, and paper dust stain.

On the other hand, upon deciding that one or more of all the detection outputs V1 are lower than the normal value V11 (i.e., abnormal value), or that one or more of all the detection outputs V2 are lower than the normal value V21 (i.e., abnormal value), under the configuration shown in FIG. 4A and FIG. 4B (NO at S5), the controller 100 decides to which of the combinations (1) to (4) shown in FIG. 8, the combination of the detection output V1 and the detection output V2, acquired from a pair of the photodetector 512 of the optical sensor 51 and the receiver 522 of the ultrasonic sensor 52 located adjacent to each other on the support member 61, corresponds (S6). The controller 100 makes the same decision, also with respect to the detection output V1 and the detection output V2, acquired from other pairs of the photodetector 512 of the optical sensor 51 and the receiver 522 of the ultrasonic sensor 52 on the support member 61.

In the case of the configuration shown in FIG. 5A and FIG. 5B also, the controller 100 decides to which of the combinations (1) to (4) shown in FIG. 8, the combination of the detection output V1 and the detection output V2, acquired from a pair of the photodetector 512 of the optical sensor 51 and the receiver 522 of the ultrasonic sensor 52 corresponds (S6). In this case, the controller 100 makes such decision with respect to the detection output V1 from the photodetector 512 of the optical sensor 51 and the detection output V2 from the receiver 522 of the ultrasonic sensor 52, detected at each of the plurality of predetermined positions.

When the detection output V1 and the detection output V2, acquired from any of the pairs or positions, are both abnormal values, in other words correspond to the combination (1) in FIG. 8 (YES at S7), the controller 100 drives the fan 70 (S8), to generate an airflow at all of the points on the transport belt 46 to be irradiated by the sensor unit 50.

The fact that the detection output V1 and the detection output V2, acquired from any of the pairs or positions, are both abnormal values as mentioned above, indicates that the color of the transport belt 46 is not the original one, and that the thickness of the transport belt 46 is not the original one, and therefore it can be assumed that the transport belt 46 is suffering the belt scraping or paper dust stain Therefore, the following operation is performed, to decide which of the belt scraping and the paper dust stain has occurred.

After driving the fan 70, the controller 100 again acquires the detection output V1 from the photodetector 512 of the optical sensor 51, and the detection output V2 from the receiver 522 of the ultrasonic sensor 52 (S9). Then the controller 100 decides, on the basis of the detection output V1 and the detection output V2 acquired at S9, whether the detection output V1 and the detection output V2, from the photodetector 512 and the receiver 522 of the pair or position decided to be abnormal values at S7, are both still abnormal values, or the detection output V1 and the detection output V2 have both turned into normal values (S10).

Upon deciding that the detection output V1 and the detection output V2 are still abnormal values ("Abnormal Value" at S10), the controller 100 decides that the transport belt 46 is suffering the belt scraping, at the position where the corresponding pair is located, or at the corresponding position (S11). In this case, the controller 100 stores the largest value of the detection output V2, among the pairs of the detection output V1 and the detection output V2 both representing the abnormal values, in the non-volatile memory as a value for predicting the remaining service life, and also the cumulative number of sheets at the time that such detection output V2 has been acquired, in the non-volatile memory (S12).

Further, the controller 100 calculates the number of recording sheets that can be transported by the transport belt 46 to be subjected to the image forming operation, before the detection output V2 reaches a predetermined threshold at which the transport belt 46 becomes no longer usable, on the basis of all the detection outputs V2 stored at this time point as the value for predicting the remaining service life, and the cumulative number of sheets stored at each of the time point that the corresponding detection output V2 was acquired (S13).

Figure 9:
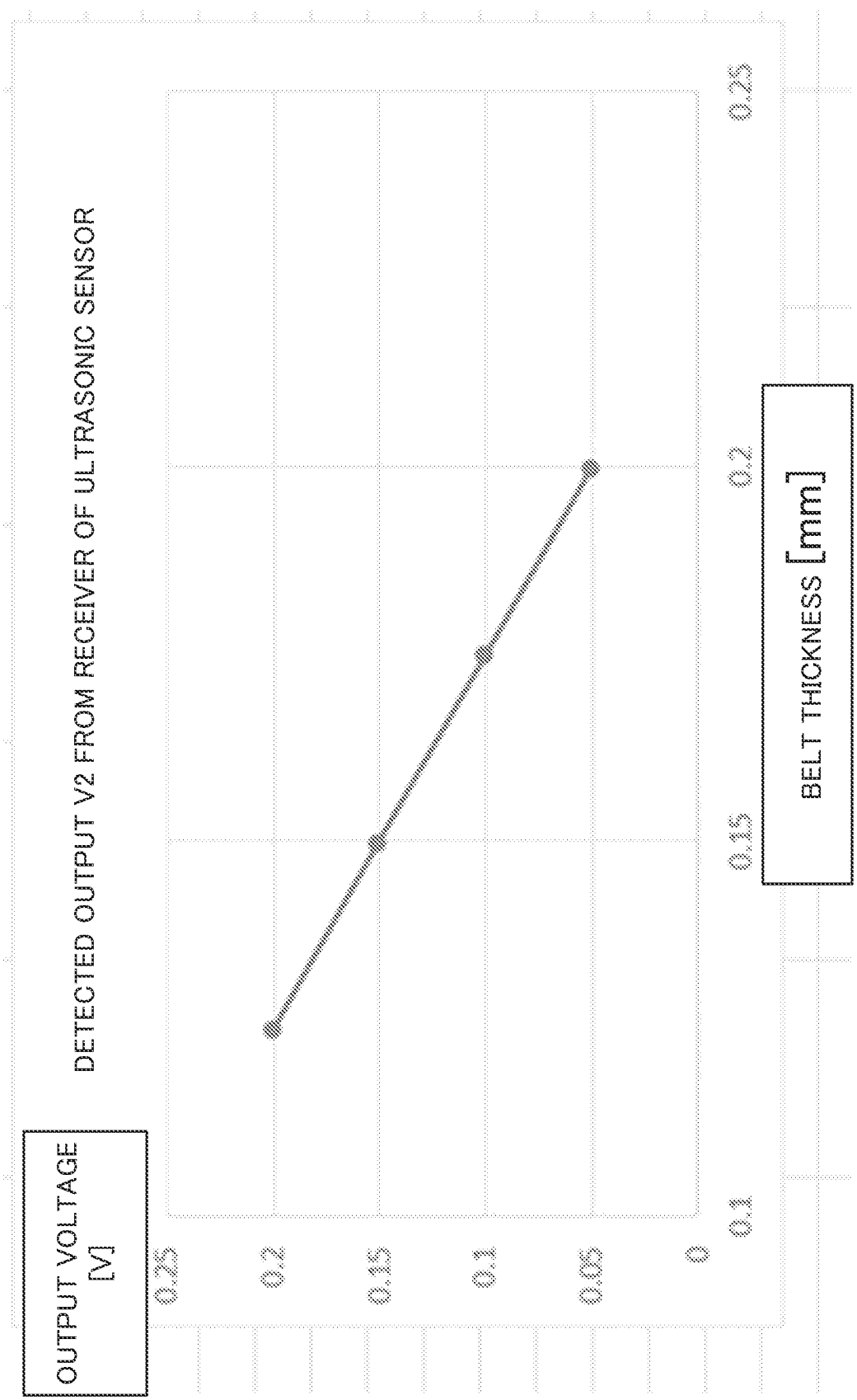
FIG. 9 is a graph showing a relation between the detection output from the receiver of the ultrasonic sensor and the thickness of the transport belt.

Referring to FIG. 9, the detection output V2 from the receiver 522 of the ultrasonic sensor 52 becomes higher, inversely proportional to the thickness of the transport belt 46. Accordingly, on the assumption that on Jan. 1, 2016, the detection output V2 was 0.05 (V) and the cumulative number of sheets on this date was 10,000 sheets, that the detection output V2 acquired at S8 on Jan. 1, 2021 was 0.15 (V), and the cumulative number of sheets on this date was 70,000 sheets, and that the limit of the thickness of the transport belt 46 that enables the recording sheet P to be normally transported is 0.10 mm (detection output V2=0.25 (V)), the number of sheets subjected to the image forming operation while the thickness of the transport belt 46 has been reduced by 0.05 mm (0.2 mm−0.15 mm), in other words while the detection output V2 has been increased by 0.10 (V) (0.15 (V)−0.05 (V)), was 60,000 sheets (70,000-10,000). Thus, since the detection output V2 is increased by 0.10 (V), after 60,000 sheets have been subjected to the image forming operation, the controller 100 calculates the number of sheets that can be printed as 60,000 sheets/0.10 (V). Therefore, the controller 100 calculates that the number of sheets that can be printed, before the detection output V2 at Jan. 1, 2021 (=0.15 (V)) reaches the detection output V2, corresponding to the limit of the thickness of the transport belt 46 (0.10 mm) that enables the recording sheet P to be normally transported (=0.25 (V)), is 60,000 sheets. Here, the predetermined threshold at which the transport belt 46 becomes no longer usable is set to 0.25 (V), in this embodiment.

Figure 10:
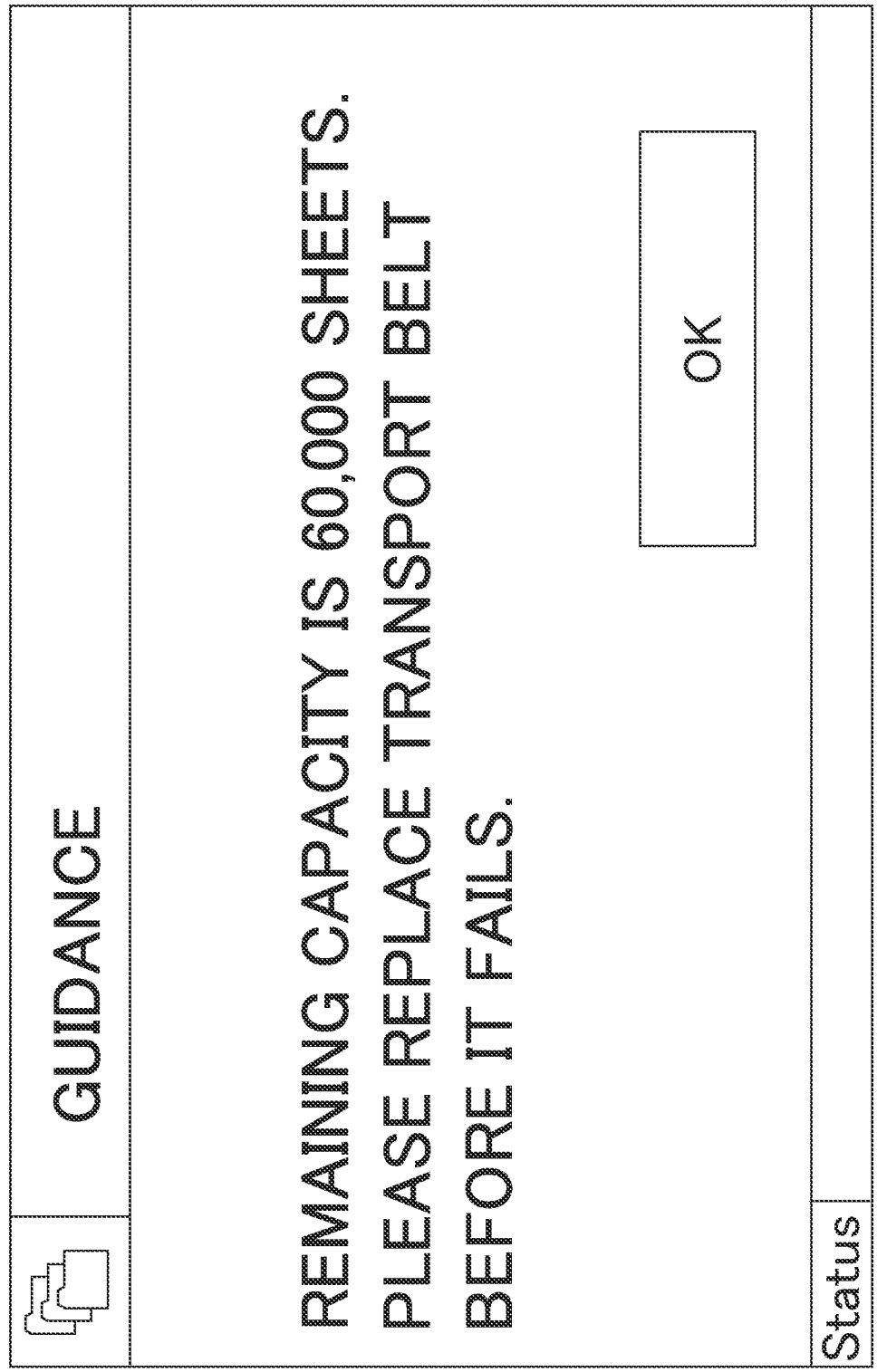
FIG. 10 is a schematic drawing showing an example of a screen of a display device.

The controller 100 causes the display device 21 to display a message indicating the number of sheets that can be printed calculated as above, and urging the user to replace the transport belt 46, as the example shown in FIG. 10 (S14). Accordingly, the user can recognize that the transport belt 46 has to be replaced before the transport belt 46 becomes no longer usable, for example because of being torn, and therefore the downtime, during which the user becomes unable to utilize the ink jet recording apparatus 1, can be minimized.

In contrast, upon deciding that the detection output V1 and the detection output V2 from the photodetector 512 and the receiver 522 of all the pairs or positions decided to be abnormal values at S7, have both turned into the normal values ("Normal Value" at S10), the controller decides that the transport belt 46 was suffering the paper dust stain, at the position where the corresponding pair is located, or at the corresponding position (S21). In this embodiment, "Abnormal Value" is selected at S10, unless the detection output V1 and the detection output V2 from the photodetector 512 and the receiver 522 of all the pairs or positions decided to be abnormal values at S7 both turn into the normal values.

The fact that generating the airflow on the transport belt 46 eliminates the trouble of the transport belt 46 indicates that the trouble of the transport belt 46 was the paper dust stain, which can be removed by blowing air. In this case, the controller 100 drives the cleaning device 80 while causing the transport belt 46 to run, to further clean the surface of the transport belt 46 (S22).

Figure 11:
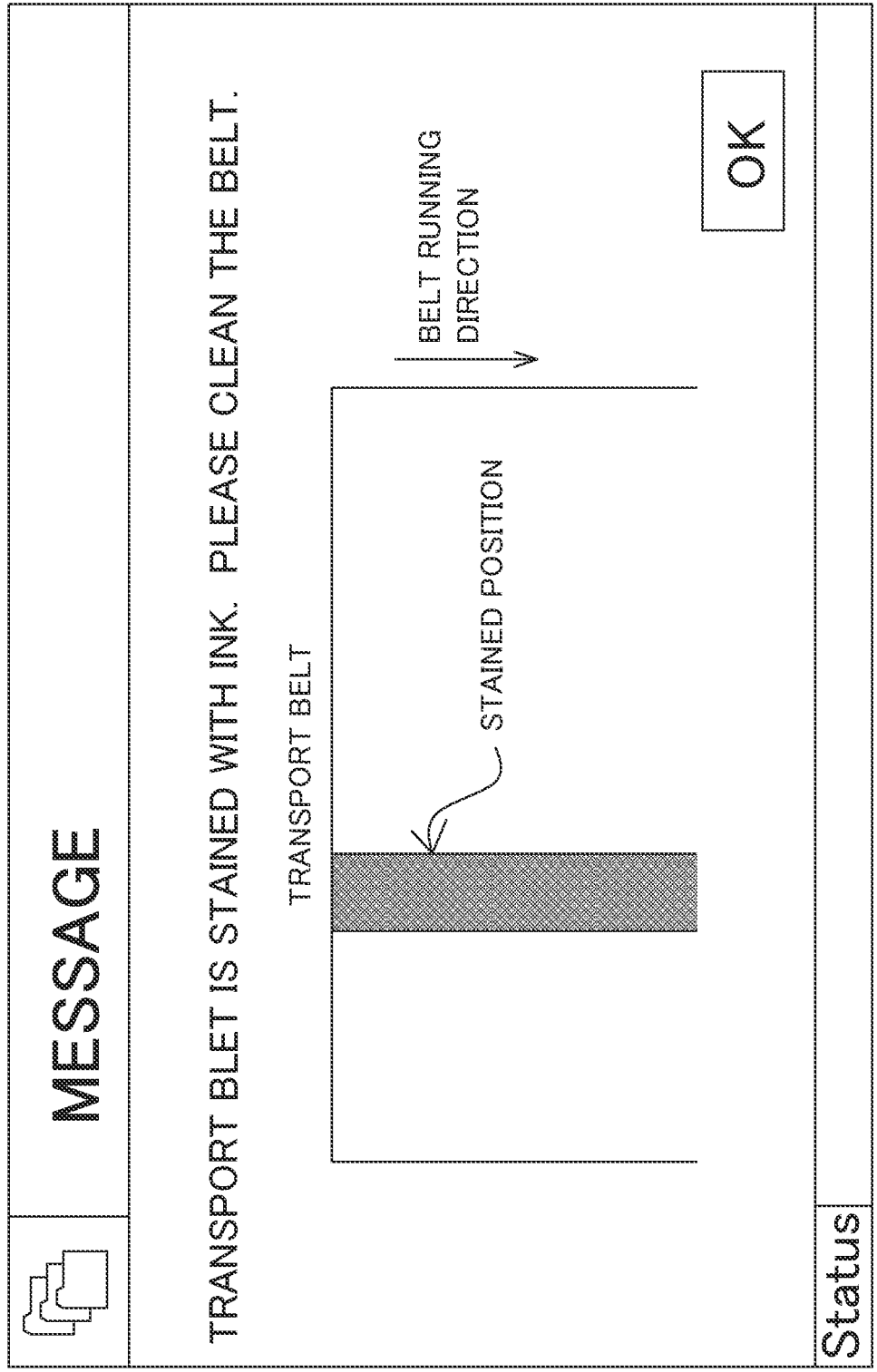
FIG. 11 is a schematic drawing showing another example of the screen of the display device.

When it is decided at S7 that the detection output V1 and the detection output V2 from any of the pairs or positions are not the abnormal values (NO at S7), the controller 100 further decides to which of the combinations shown in FIG. 8 the decision result about the detection output V1 and the detection output V2 corresponds, with respect to the detection output V1 and the detection output V2 from the sensor unit 50 of the pair or position, not decided to be the abnormal values at S7 (S31). When the detection output V1 is the abnormal value and the detection output V2 is the normal value ((2) at S31), the controller 100 decides that the transport belt 46 is suffering the ink stain, at the position where the corresponding pair is located, or at the corresponding position (S32). Upon deciding thus that the transport belt 46 is suffering the ink stain, the controller 100 decides that the stain is located at the position on the transport belt 46 corresponding to the position of the optical sensor 51 and the ultrasonic sensor 52 in the width direction, stored in association with the detection output V1 and the detection output V2. In this case, the controller 100 causes the display device 21 to display a message indicating that the transport belt 46 is suffering the ink stain, with the position of the stain, as the example shown in FIG. 11 (S33). Here, the message urging the user to clean the transport belt 46 is to be construed as being encompassed in the message indicating that the transport belt 46 is stained.

When it is decided at S31 that the detection output V1 and the detection output V2 are both normal values ((4) at S31), the controller 100 decides that the transport belt 46 is free from stain or scraping at the position where the corresponding pair is located, or at the corresponding position, in other words in a good condition (S34). In this embodiment, the controller 100 also decides that the transport belt 46 is free from stain or scraping at the position where the corresponding pair is located, or at the corresponding position, in other words in a good condition, when it is decided at S31 that the detection output V1 is the normal value and the detection output V2 is the abnormal value ((3) at S31). The controller 100 causes the display device 21 to display such decision results (S35).

According to this embodiment, as described thus far, when the transport belt 46 transporting the recording medium to the image forming device 13 suffers abnormality, the type of the trouble can be identified, and different controls for the solution can be executed, such as causing the display device 21 to display an appropriate message for each types of the trouble of the transport belt 46, or causing the cleaning device 80 to clean the surface of the transport belt 46.

With the known detection methods that employ the optical sensor, it is difficult to precisely identify the type of the stain. Whereas the stain of the transport belt may be caused, for example, by scraping, ink, or paper dust, although the fact that the transport belt is suffering a stain can be detected from the output acquired from the optical sensor, the different controls appropriate for the respective causes of the trouble are unable to be executed, according to the type of the trouble that the transport belt is suffering. With the arrangement according to the foregoing embodiment, however, the different controls appropriate for the respective causes of the trouble can be executed, when the transport belt 46 suffers abnormality.

The disclosure may be modified in various manners, without limitation to the configuration according to the foregoing embodiment. For example, although the image forming apparatus according to the disclosure is exemplified by the ink jet recording apparatus 1 in the embodiment, the image forming apparatus according to the disclosure may be of a different type, such as an image forming apparatus that employs an electrophotography process. Further, the configurations and processings according to the foregoing embodiments, described with reference to FIG. 1 to FIG. 11, are merely exemplary and in no way intended to limit the disclosure to those configurations and processings.

While the present disclosure has been described in detail with reference to the embodiments thereof, it would be apparent to those skilled in the art the various changes and modifications may be made therein within the scope defined by the appended claims.

What is claimed is:

1. An image forming apparatus comprising:
   an image forming device that forms an image on a recording medium;
   an endless transport belt that transports the recording medium placed on a surface thereof, to an image forming position where the image forming device forms the image on the recording medium;
   an optical sensor including a light emitting element that emits light to the transport belt, and a photodetector that receives the light reflected by the transport belt;
   an ultrasonic sensor including a transmitter that transmits ultrasonic wave to the transport belt, and a receiver that receives the ultrasonic wave transmitted through the transport belt; and
   a controller that decides whether an output from each of the photodetector of the optical sensor and the receiver of the ultrasonic sensor represents a normal value or an abnormal value, and executes predetermined control, depending on a combination of decision results about the respective outputs from the photodetector and the receiver.

2. The image forming apparatus according to claim 1, wherein a plurality of the optical sensors and the ultrasonic sensors are aligned in a width direction of the transport belt, orthogonal to a running direction of the transport belt.

3. The image forming apparatus according to claim 1, further comprising a carriage that moves in a width direction of the transport belt, orthogonal to a running direction of the transport belt, in a region opposite a surface of the transport belt and spaced therefrom,
   wherein the optical sensor and the ultrasonic sensor are mounted on the carriage.

4. The image forming apparatus according to claim 1, further comprising an alerter that outputs a message,
   wherein, upon deciding that the output from the photodetector of the optical sensor represents the abnormal value, and that the output from the receiver of the ultrasonic sensor represents the normal value, the controller causes, as the predetermined control, the alerter to output a message indicating that the transport belt is stained.

5. The image forming apparatus according to claim 4, further comprising a fan that generates an airflow on the transport belt, at a position to which the light emitting element of the optical sensor emits the light, and a position to which the transmitter of the ultrasonic sensor emits the ultrasonic wave,
   wherein the controller is configured to:
   cause the fan to generate the airflow on the transport belt, upon deciding that the respective outputs from the photodetector of the optical sensor and the receiver of the ultrasonic sensor both represent the abnormal value; and
   cause the alerter to output a message urging replacement of the transport belt, upon deciding that the respective outputs from the photodetector of the optical sensor and the receiver of the ultrasonic sensor both still represent the abnormal value, even after causing the fan to generate the airflow on the transport belt.

6. The image forming apparatus according to claim 5, wherein the controller is configured to:
   count a cumulative number of sheets of the recording medium on which the image forming device has formed an image, from a time that the transport belt started to be used;
   store the output from the receiver of the ultrasonic sensor each time the output is acquired, in association with the cumulative number of sheets counted; and
   calculate, on a basis of the stored output from the receiver of the ultrasonic sensor and the cumulative number of sheets at the time that the output was acquired, a number of sheets of the recording medium on which the image can be formed, before the output reaches a predetermined threshold at which the transport belt becomes unusable.

7. The image forming apparatus according to claim 5, further comprising a cleaning device that cleans a surface of the transport belt,
   wherein the controller causes the cleaning device to clean the transport belt, upon deciding that the respective outputs from the photodetector of the optical sensor and the receiver of the ultrasonic sensor both represent the normal value, after causing the fan to generate the airflow.

8. The image forming apparatus according to claim 4, wherein a plurality of the optical sensors and the ultrasonic sensors are aligned in a width direction of the transport belt, orthogonal to a running direction of the transport belt, and
   the controller is configured to:
   store the respective outputs acquired from all of the photodetectors of the optical sensors and the receivers of the ultrasonic sensors aligned in the width direction of the transport belt, in association with respective positions in the width direction where the optical sensor and the ultrasonic sensor are located;
   upon deciding that the output from the photodetector of the optical sensor represents the abnormal value, and the output from the receiver of the ultrasonic sensor represents the normal value, decide that the transport belt is stained at the position where the corresponding optical sensor is located, stored in association with the output; and cause the alerter to output a message indicating that the transport belt is stained at the position where the corresponding optical sensor is located.

9. The image forming apparatus according to claim 4, further comprising a carriage that moves in a width direction of the transport belt, orthogonal to a running direction of the transport belt, in a region opposite a surface of the transport belt and spaced therefrom,
- wherein the optical sensor and the ultrasonic sensor are mounted on the carriage, and
- the controller is configured to:
- store the respective outputs acquired from the photodetector of the optical sensor and the receiver of the ultrasonic sensor, at each of a plurality of positions in a width direction of the transport belt in which the carriage has moved, in association with the position of the optical sensor and the ultrasonic sensor in the width direction;
- upon deciding that the output from the photodetector of the optical sensor represents the abnormal value, and the output from the receiver of the ultrasonic sensor represents the normal value, decide that the transport belt is stained at the position stored in association with the corresponding output; and
- cause the alerter to output a message indicating that the transport belt is stained at the stored position.

\* \* \* \* \*